US011608811B2

(12) United States Patent
Vaddi et al.

(10) Patent No.: US 11,608,811 B2
(45) Date of Patent: Mar. 21, 2023

(54) SYSTEM AND METHOD FOR MITIGATING LOADS ACTING ON A ROTOR BLADE OF A WIND TURBINE

(71) Applicant: General Electric Renovables Espana, S.L., Barcelona (ES)

(72) Inventors: Prashanth Kumar Reddy Vaddi, Bangalore (IN); Shuang Gu, Shanghai (CN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/224,506

(22) Filed: Apr. 7, 2021

(65) Prior Publication Data
US 2021/0317817 A1    Oct. 14, 2021

(30) Foreign Application Priority Data

Apr. 8, 2020    (CN) .......................... 202010268295.6

(51) Int. Cl.
*F03D 9/00*    (2016.01)
*H02P 9/04*    (2006.01)
(Continued)

(52) U.S. Cl.
CPC ........... *F03D 7/0224* (2013.01); *F03D 7/042* (2013.01); *F03D 17/00* (2016.05);
(Continued)

(58) Field of Classification Search
CPC ........ F03D 7/0224; F03D 17/00; F03D 7/042; F05B 2270/1095; F05B 2270/328; F05B 2270/331; F05B 2270/332
See application file for complete search history.

(56) References Cited

U.S. PATENT DOCUMENTS 6,361,275 B1    3/2002  Wobben
6,619,918 B1 *  9/2003  Rebsdorf ................ F03D 17/00
                                                        416/37
(Continued)

FOREIGN PATENT DOCUMENTS

EP    2302207 A1    3/2011
EP    2486272 A2    8/2012
(Continued)

OTHER PUBLICATIONS

European Search Report for EP Application No. 21165669.9, dated Aug. 23, 2021.
(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A method for mitigating loads acting on a rotor blade of a wind turbine includes receiving a plurality of loading signals and determining at least one load acting on the rotor blade based on the loading signals. Further, the method includes determining a type of the load(s) acting on the rotor blade. Moreover, the method includes comparing the load(s) to a loading threshold, such as an extreme loading threshold. In addition, the method includes implementing a control scheme when the load(s) exceeds the loading threshold. More specifically, the control scheme includes providing a first pitching mode for reducing a first type of load, providing a different, second pitching mode for reducing a different, second type of load, and coordinating the first and second pitching modes based on the type of the at least one load to mitigate the loads acting on the rotor blade.

14 Claims, 5 Drawing Sheets

(51) Int. Cl.
  *F03D 7/02* (2006.01)
  *F03D 17/00* (2016.01)
  *F03D 7/04* (2006.01)

(52) U.S. Cl.
  CPC .............. *F05B 2270/1031* (2013.01); *F05B 2270/1095* (2013.01); *F05B 2270/328* (2013.01); *F05B 2270/331* (2013.01); *F05B 2270/332* (2013.01)

(56) References Cited

U.S. PATENT DOCUMENTS

| | | | |
|---|---|---|---|
| 7,452,185 B2 * | 11/2008 | Ide | F03D 7/024 416/61 |
| 7,569,945 B2 | 8/2009 | Pedersen | |
| 8,239,071 B2 | 8/2012 | Lausen | |
| 8,249,754 B2 | 8/2012 | Hayashi et al. | |
| 8,261,599 B2 | 9/2012 | Jeffrey et al. | |
| 8,398,369 B2 | 3/2013 | Rebsdorf et al. | |
| 8,430,634 B2 | 4/2013 | Williams | |
| 8,803,351 B2 * | 8/2014 | Dalsgaard | F03D 7/0292 290/55 |
| 9,366,230 B2 | 6/2016 | Perley et al. | |
| 9,523,352 B2 | 12/2016 | Hernandex Mascarell et al. | |
| 9,567,978 B2 | 2/2017 | Marwaha et al. | |
| 9,745,958 B2 | 8/2017 | Agarwal et al. | |
| 2004/0151575 A1 * | 8/2004 | Pierce | F03D 17/00 415/1 |
| 2006/0002792 A1 * | 1/2006 | Moroz | F03D 7/0292 416/1 |
| 2010/0014969 A1 | 1/2010 | Wilson et al. | |
| 2011/0115224 A1 | 5/2011 | Lausen | |
| 2012/0134813 A1 | 5/2012 | Nies et al. | |
| 2014/0178197 A1 | 6/2014 | Risager et al. | |
| 2015/0132128 A1 | 5/2015 | Zaib et al. | |
| 2015/0176568 A1 | 6/2015 | Laborda Rubio et al. | |
| 2016/0252075 A1 | 9/2016 | Kruger et al. | |

FOREIGN PATENT DOCUMENTS

| | | |
|---|---|---|
| EP | 3015705 A1 | 5/2016 |
| EP | 3064770 A1 | 9/2016 |
| WO | WO2010/016764 A1 | 2/2010 |
| WO | WO2016/023556 A1 | 2/2016 |
| WO | WO2016/034180 A1 | 3/2016 |
| WO | WO2016/091945 A1 | 6/2016 |
| WO | WO2016/169964 A1 | 10/2016 |

OTHER PUBLICATIONS

Bossanyi, Further Load Reductions with Individual Pitch Control, Wind Energy, Wiley Online Library, Jul. 7, 2005 (ABSTRACT ONLY) http://onlinelibrary.wiley.com/doi/10.1002/we.166/abstract.
Vali et al., Optimal Multivariable Individual Pitch Control for Load Reduction of Large Wind Turbines, American Control Conference (ACC) Jul. 6-8, 2016, pp. 3163-3169.

* cited by examiner

SYSTEM AND METHOD FOR MITIGATING LOADS ACTING ON A ROTOR BLADE OF A WIND TURBINE

FIELD

The present disclosure relates generally to wind turbines and, more particularly, to a system and method for mitigating rotor blade loads acting on a wind turbine.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

The amount of power that may be produced by a wind turbine is typically limited by structural limitations (i.e. design loads) of the individual wind turbine components. For example, the blade root of a wind turbine may experience loads (e.g. such as blade tip deflection, a blade bending moment, or various blade forces) associated with both average loading due to turbine operation and dynamically fluctuating loads due to environmental conditions. Such loading may damage turbine components, thereby eventually causing the turbine components to fail. The fluctuating loads can change day-to-day or season-to-season and may be based on wind speed, wind peaks, wind turbulence, wind shear, changes in wind direction, density in the air, yaw misalignment, upflow, or similar. Specifically, for example, loads experienced by a wind turbine may vary with wind speed.

As such, it is imperative to ensure loads acting on the wind turbine do not exceed design loads. Thus, many wind turbines employ one or more sensors configured to measure the loads acting on the various wind turbine components. Though the sensors may provide the desired information, new sensor systems can be complex and expensive to install. Further, the sensors may provide inaccurate information and can be prone to fail.

Additionally, large rotors can suffer from small blade tip-tower clearance and high blade root bending moments, especially during extreme turbulence and extreme wind shear conditions due to a combination of mean thrust on the rotor and an imbalance load over the rotor. Furthermore, conventional systems rely on only collective pitch for reducing the blade root bending moments and only on cyclic pitching for increasing tip clearance. Thus, such control actions independently target only a specific source of imbalance, i.e. either collective pitching for mean thrust control or cyclic pitching for imbalance loads.

In view of the foregoing, the art is continuously seeking new and improved systems for mitigating loads acting on wind turbine rotor blades. Thus, the present disclosure is directed to systems and methods for mitigating loads acting rotor blades by providing leading time in estimated future loading signals by using both deflection and velocity of blade modes, thereby providing faster pitch responses.

BRIEF DESCRIPTION

Aspects and advantages of the invention will be set forth in part in the following description, or may be obvious from the description, or may be learned through practice of the invention.

In one aspect, the present disclosure is directed to a method for mitigating loads acting on a rotor blade of a wind turbine. The method includes receiving a plurality of loading signals of the rotor blade. The method also includes determining at least one load acting on the rotor blade based on the plurality of loading signals of the rotor blade. Further, the method includes determining a type of the load(s) acting on the rotor blade. Moreover, the method includes comparing the load(s) to a loading threshold, such as an extreme loading threshold. In addition, the method includes implementing a control scheme when the load(s) exceeds the loading threshold. More specifically, the control scheme includes providing a first pitching mode for reducing a first type of load, providing a different, second pitching mode for reducing a different, second type of load, and coordinating the first and second pitching modes based on the type of the at least one load to mitigate the loads acting on the rotor blade.

In an embodiment, the type of the load(s) acting on the rotor blade may include a rotor imbalance or a thrust, such as mean thrust, of a rotor of the wind turbine.

In particular embodiments, the first type of load may be the thrust and the second type of load may be the rotor imbalance. In such embodiments, the first pitching mode may be a collective pitching mode and the second pitching mode may be a cyclic pitching mode.

In further embodiments, coordinating the first and second pitching modes based on the first and second types may include coordinating the first and second pitching modes based on the type of the load(s) acting on the rotor blade using a hierarchical approach. For example, in an embodiment, the method may include first activating the cyclic pitching mode with pitch angle setpoints that reduce the loads acting on the rotor blade to a reduced load amount, subsequently receiving one or more residual loading signals of the rotor blade, and comparing the residual loading signal(s) of the rotor blade to a second loading threshold. If the residual loading signal(s) of the rotor blade exceed the second loading threshold, the method may further include subsequently activating the collective pitching mode to further reduce the reduced load amount.

In several embodiments, the cyclic pitching mode is configured to reduce a majority of the loads acting on the rotor blade, whereas the collective pitching mode accounts for pitch system saturation and reduces the mean thrust. In an embodiment, the cyclic pitching mode may include pitching each of the rotor blades cyclically along their respective pitch axes and the collective pitching mode may include pitching each of the rotor blades together along their respective pitch axes.

In another aspect, the present disclosure is directed to a system for mitigating loads acting on a rotor blade of a wind turbine. The system includes one or more sensors configured to generate a plurality of loading signals relating to the rotor blade and a controller communicatively coupled to the sensor(s). The controller includes a processor configured to perform a plurality of operations, including but not limited to receiving the plurality of loading signals of the rotor blade, determining at least one load acting on the rotor blade based on the plurality of loading signals of the rotor blade, determining a type of the load(s) acting on the rotor blade, comparing the load(s) to a loading threshold, and implementing a control scheme when the load exceeds the loading threshold. More specifically, the control scheme includes providing a first pitching mode for reducing a first type of load, providing a different, second pitching mode for reducing a different, second type of load, and coordinating the first and second pitching modes based on the type of the load(s) to mitigate the loads acting on the rotor blade. It should be understood that the system may also include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and methods for mitigating rotor blade loads, such as blade root bending moment, of a wind turbine. In one embodiment, for example, the present disclosure harmonizes the collective and cyclic modes of pitching through a hierarchical approach during extreme imbalance load conditions. More specifically, when a high imbalance load is detected by comparing the estimated/predicted blade root bending moment/tip clearance against a threshold, the cyclic pitching is activated with aggressive setpoints. After the cyclic pitching is activated, the residual load is again compared against a second threshold. Based on the difference between the reduced load and the threshold, some amount of collective pitch is used to further reduce the imbalance load. As such, the cyclic pitching mode is used as a primary lever to the full extent of pitch system capability to reduce the imbalance load, with collective pitching only used to cover for pitch system saturation and mean thrust loading. The present disclosure is thus more effective in imbalance load reduction and efficient in the annual energy production (AEP) loss associated with such loss.

The various embodiments of the system and method described herein provide numerous advantages. For example, the present disclosure helps to reduce extreme loads, such as tip clearance loading and blade root bending moments, with minimal AEP impact. The ability to control extreme loads can increase AEP in the knee region of the power curve. Moreover, the present disclosure may be implemented using existing components of the wind turbine and does not require additional sensors. As such, a user is not required to purchase, install, and maintain new equipment. Moreover, the system may be integrated with a broader control system, such as, but not limiting of, a wind turbine control system, a plant control system, a remote monitoring system, or combinations thereof.

Figure 1:
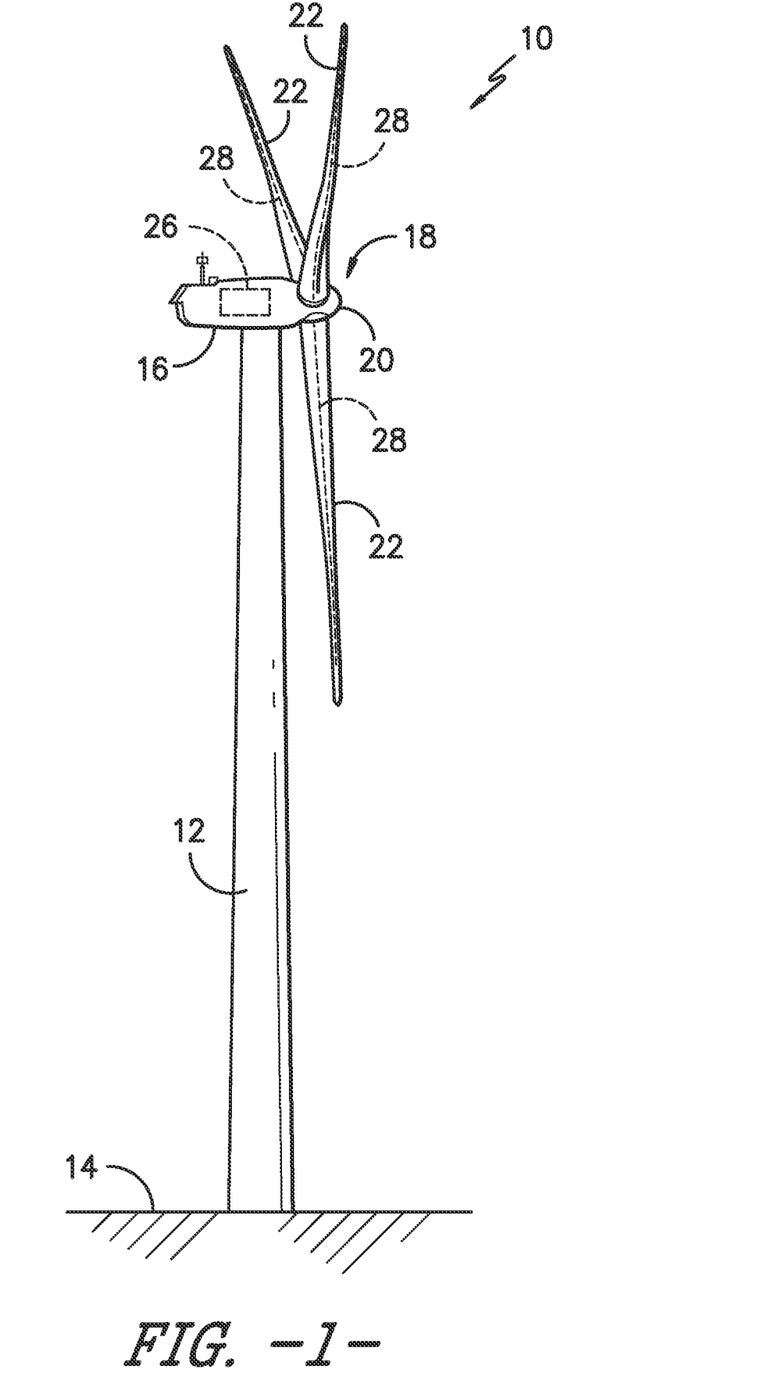
FIG. 1 illustrates a perspective view of one embodiment of a wind turbine according to the present disclosure.

Referring now to FIG. 1, a perspective view of one embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rate the wind turbine, and/or control various components of the wind turbine 10 as will be discussed in more detail below.

Figure 2:
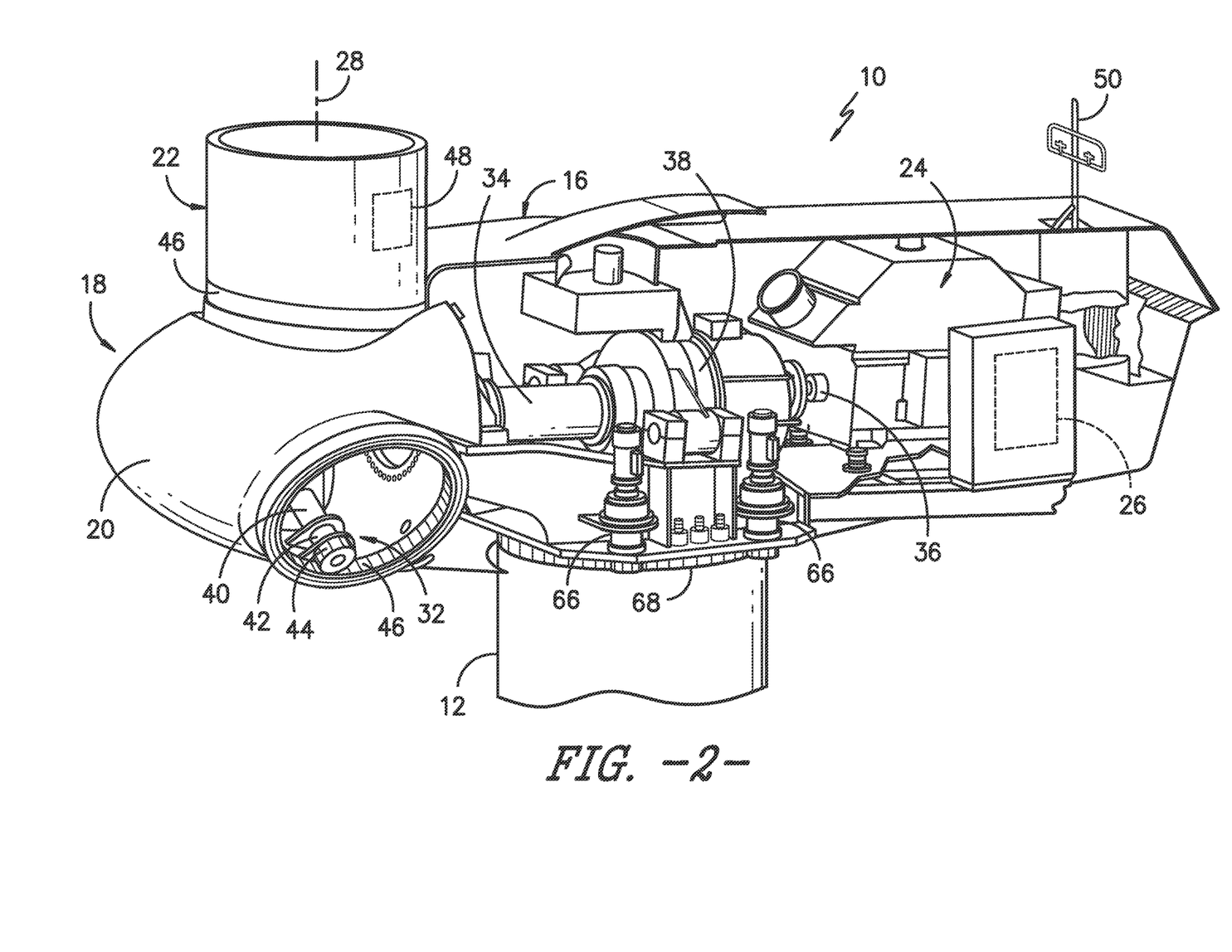
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Still referring to FIG. 2, the wind turbine 10 may also include one or more sensors 48, 50 for generating measurement data relating to the rotor blade and/or any other operating parameters that may be required to determine the various loading conditions described herein. For example, in various embodiments, the sensor(s) may include one or more blade sensors 48 for measuring a load acting on one of the rotor blades 22; generator sensors (not shown) for monitoring the generator 24 (e.g. torque, rotational speed, acceleration and/or the power output); sensors for measuring the imbalance loading in the rotor (e.g. main shaft bending sensors); and/or various wind sensors 50 for measuring various wind parameters, such as wind speed, wind peaks, wind turbulence, wind shear, changes in wind direction, air density, or similar. Further, the sensors may be located near the ground of the wind turbine, on the nacelle, or on a meteorological mast of the wind turbine.

It should also be understood that any other number or type of sensors may be employed and at any location. For example, the sensors may include, for example, Micro Inertial Measurement Units (MIMUs), strain gauges, accelerometers, pressure sensors, vibration sensors, proximity sensors, or camera sensors. It should be appreciated that, as used herein, the term "monitor" and variations thereof indicates that the various sensors may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter.

Figure 3:
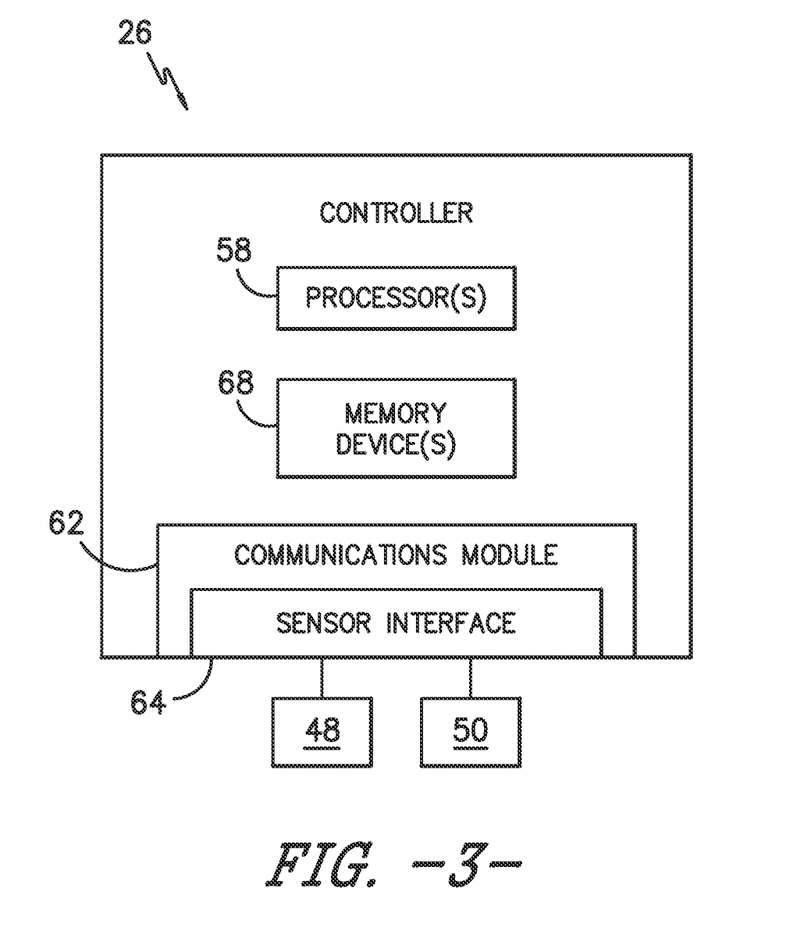
FIG. 3 illustrates a schematic diagram of one embodiment of a controller according to the present disclosure.

Referring now to FIG. 3, there is illustrated a block diagram of one embodiment of various components of the controller 26 according to the present disclosure. As shown, the controller 26 may include one or more processor(s) 58 and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50 to be converted into signals that can be understood and processed by the processors 58. It should be appreciated that the sensors 48, 50 may be communicatively coupled to the communications module 62 using any suitable means. For example, as shown in FIG. 3, the sensors 48, 50 are coupled to the sensor interface 64 via a wired connection. However, in other embodiments, the sensors 48, 50 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more current wind turbine parameters of the wind turbine 10 based on the plurality of operating data, determining a maximum wind turbine parameter, transmitting suitable control signals to implement control actions to reduce loads acting on the wind turbine, and various other suitable computer-implemented functions.

The processor 58 is configured to utilize the measured operating parameters from the sensors 48, 50 to estimate rotor blade loads (e.g. tip deflection, blade root resultant moments, and/or forces) of the wind turbine 10. For example, the sensors 48, 50 are configured to measure various wind turbine and/or environmental conditions, so as to directly or indirectly provide information regarding one or more of the following parameters: a rotor thrust, a mechanical torque, forces acting on the rotor blades 22, rotor imbalance measurements, a rotor azimuth angle, rotor speed, a gearbox ratio, a nodding moment, an overhang moment, a yawing moment, gravity, a hub radius, a blade radius, a cone angle, a blade mass, a blade weight, a center of gravity location for each of the rotor blades 22, or any other operating parameter of the wind turbine 10.

Figure 4:
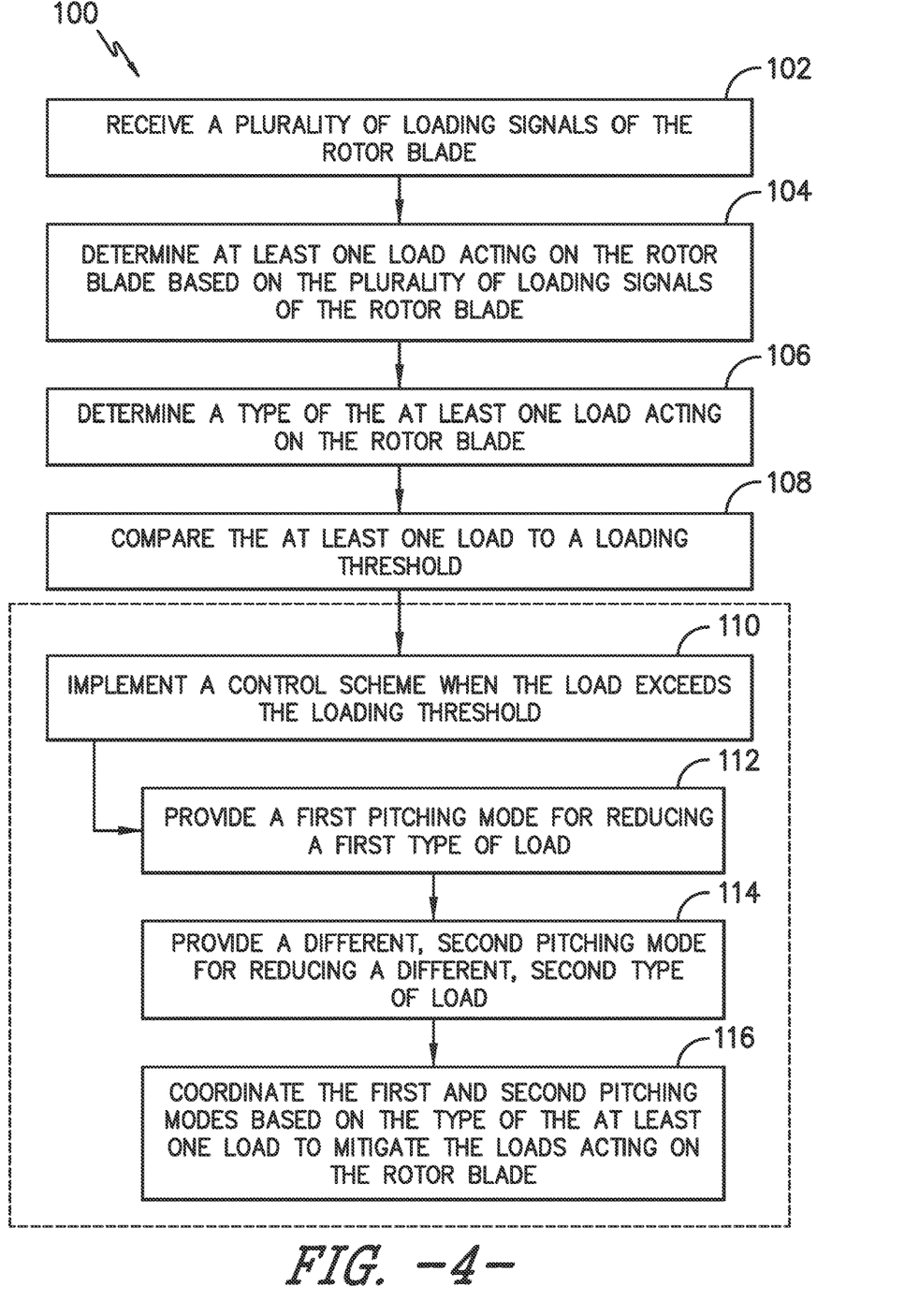
FIG. 4 illustrates a flow diagram of one embodiment of a method for mitigating loads acting on a rotor blade of a wind turbine according to the present disclosure.

Referring now to FIG. 4, a flow diagram of one embodiment of a method 100 for mitigating loads acting on a rotor blade of a wind turbine is illustrated. The method 100 may be implemented using, for instance, the turbine controller 26 discussed above with references to FIGS. 1-3. FIG. 4 depicts steps performed in a particular order for purposes of illustration and discussion. Those of ordinary skill in the art, using the disclosures provided herein, will understand that various steps of the method 100, or any of the methods disclosed herein, may be adapted, modified, rearranged, performed simultaneously, or modified in various ways without deviating from the scope of the present disclosure.

As shown at (102), the method 100 includes receiving a plurality of loading signals of the rotor blade(s) 22.

As shown at (104), the method 100 includes determining at least one load acting on the rotor blade(s) 22 based on the plurality of loading signals of the rotor blade(s) 22.

As shown at (106), the method 100 includes determining a type of the load(s) acting on the rotor blade(s) 22. For example, in an embodiment, the type of the load(s) acting on the rotor blade(s) 22 may include a rotor imbalance or a thrust, such as mean thrust, of the rotor 18. As shown at (108), the method 100 includes comparing the load(s) to a loading threshold, such as an extreme loading threshold.

As shown at (110), the method 100 includes implementing a control scheme when the load(s) exceeds the loading threshold. More specifically, as shown at (112), the control scheme 110 includes providing a first pitching mode for reducing a first type of load. As shown at (114), the control scheme 110 includes providing a different, second pitching mode for reducing a different, second type of load. In particular embodiments, for example, the first type of load may be a mean thrust and the second type of load may be a rotor imbalance. In such embodiments, the first pitching mode may be a cyclic pitching mode, whereas the second pitching mode may be a collective pitching mode. In such embodiments, the cyclic pitching mode may include pitching each of the rotor blades cyclically along their respective pitch axes and the collective pitching mode may include pitching each of the rotor blades together along their respective pitch axes. Accordingly, the cyclic pitching mode is configured to reduce a majority of the loads acting on the rotor blade(s), whereas the collective pitching mode accounts for pitch system saturation and mean thrust loading.

Thus, as shown at (116), the control scheme 110 includes coordinating the first and second pitching modes based on the type of the load(s) to mitigate the loads acting on the rotor blade(s) 22. In further embodiments, coordinating the first and second pitching modes based on the first and second types may include coordinating the first and second pitching modes based on the type of the load(s) acting on the rotor blade using a hierarchical approach. For example, in an embodiment, when a high imbalance load is detected by comparing the estimated/predicted blade root bending moment/tip clearance against a threshold, the controller 26 may first activate the cyclic pitching mode with pitch angle setpoints that reduce the loads acting on the rotor blade(s) 22 to a reduced load amount. Subsequently, the method 100 may include receiving one or more residual loading signals of the rotor blade(s) 22 and comparing the residual loading signal(s) of the rotor blade(s) 22 to a second loading threshold. If the residual loading signal(s) of the rotor blade(s) 22 exceed the second loading threshold, the controller 26 may subsequently activate the collective pitching mode to further reduce the reduced load amount.

Thus, system and method of the present disclosure harmonizes the collective and cyclic pitching modes through a hierarchical approach during extreme imbalance load conditions. Accordingly, the cyclic pitching is used as a primary lever to the full extent of pitch system capability to reduce the imbalance load present, with the collective pitching mode used to cover for pitch system saturation and mean thrust loading. This approach is thus more effective in imbalance load reduction and efficient in the AEP loss associated with it.

In addition, in certain embodiments, the controller 26 is configured to implement any other suitable control action based on the comparison of the load to the loading threshold so as to reduce the blade tip deflection and the blade root bending moment. For example, in several embodiments, the control action may include temporarily de-rating or up-rating the wind turbine to prevent excessive loads on one or more of the wind turbine components. Up-rating the wind turbine, such as by up-rating torque, may temporarily slow down the wind turbine and act as a brake to help reduce or prevent loading.

De-rating the wind turbine may include speed de-rating, torque de-rating or a combination of both. Further, as mentioned, the wind turbine 10 may be de-rated by pitching one or more of the rotor blades 22 about its pitch axis 28. More specifically, the controller 26 may generally control each pitch adjustment mechanism 32 in order to alter the pitch angle of each rotor blade 22 between 0 degrees (i.e., a power position of the rotor blade 22) and 90 degrees (i.e., a feathered position of the rotor blade 22). As such, in one embodiment, the controller 26 may command a new pitch set point (e.g. from 0 degrees to 5 degrees), whereas in another embodiment, the controller 26 may specify a new pitch constraint (e.g. a constraint to ensure that subsequent pitch commands are at least 5 degrees).

In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

The wind turbine 10 may also be temporarily de-rated by yawing the nacelle 22 to change the angle of the nacelle 16 relative to the direction of the wind. In further embodiments, the controller 26 may be configured to actuate one or more mechanical brake(s) in order to reduce the rotational speed of the rotor blades 22, thereby reducing component loading. In still further embodiments, the controller 26 may be configured to perform any appropriate control action known in the art. Further, the controller 26 may implement a combination of two or more control actions.

Figure 5:
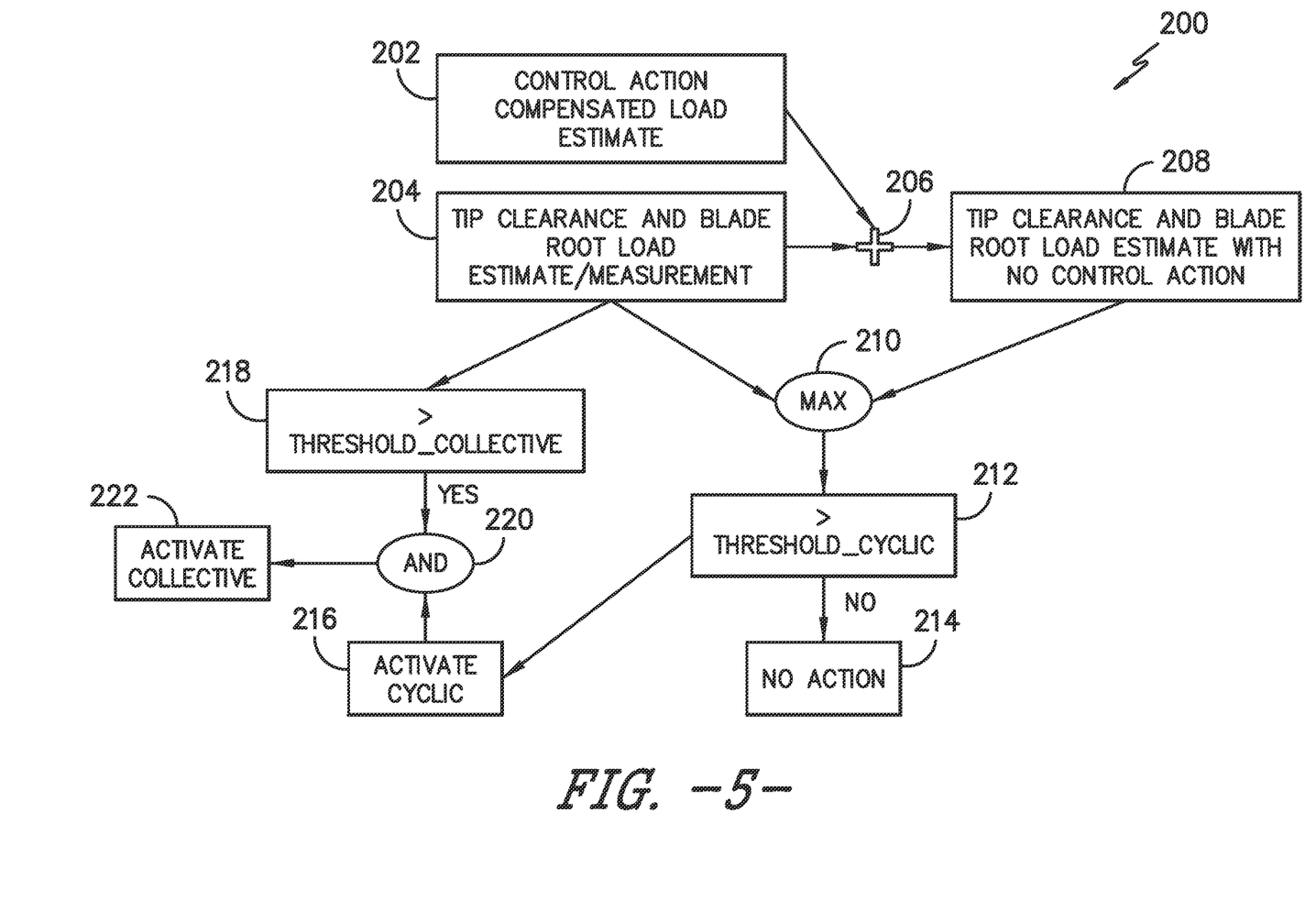
FIG. 5 illustrates a schematic diagram of one embodiment of a system for mitigating extreme loads acting on a rotor blade of a wind turbine according to the present disclosure.

Referring now to FIG. 5, a schematic diagram of one embodiment of a system 200 for implementing extreme imbalance load control is illustrated to further explain the method 100 described herein. As shown at (202), the system 200 estimates control-action-compensated load. As shown at (204), the system 200 estimates or measures the tip clearance and blade root load. As shown at (206), the system 200 adds the estimates/measurements from (202) and (204) to obtain a tip clearance and blade root estimate without any control action (208). As shown at (210), a maximum value between the tip clearance and blade root load estimate/measurement (204) and the tip clearance and blade root estimate without any control action (208) is determined. As shown at (212), the maximum value 210 is compared to a cyclic threshold. As shown at (214), if the maximum value 210 is less than the cyclic threshold, no further action is taken. In contrast, as shown at (216), if the maximum value 210 is greater than the cyclic threshold, the system 200 activates the cyclic pitching mode described herein. In addition, as shown at (218), the tip clearance and blade root load estimate/measurement (204) may be compared to a collective threshold. As shown at (220), if the tip clearance and blade root load estimate/measurement (204) is greater than the collective threshold and the cyclic pitching mode is activated, then the system 200 may then activate the collective pitching mode (222) described herein.

Various aspects and embodiments of the present invention are defined by the following numbered clauses:

Clause 1. A method for mitigating loads acting on a rotor blade of a wind turbine, the method comprising:
receiving a plurality of loading signals of the rotor blade;
determining at least one load acting on the rotor blade based on the plurality of loading signals of the rotor blade;
determining a type of the at least one load acting on the rotor blade;
comparing the at least one load to a loading threshold; and,
implementing a control scheme when the load exceeds the loading threshold, the control scheme comprising:
providing a first pitching mode for reducing a first type of load;
providing a different, second pitching mode for reducing a different, second type of load; and,
coordinating the first and second pitching modes based on the type of the at least one load to mitigate the loads acting on the rotor blade.

Clause 2. The method of clause 1, wherein the type of the at least one load acting on the rotor blade comprises at least one of a rotor imbalance or a thrust of a rotor of the wind turbine.

Clause 3. The method of any of the preceding clauses, wherein the first type of load comprises the rotor imbalance and the second type of load comprises the thrust.

Clause 4. The method of any of the preceding clauses, wherein the first pitching mode comprises a cyclic pitching mode, and wherein the second pitching mode comprises a collective pitching mode.

Clause 5. The method of any of the preceding clauses, wherein coordinating the first and second pitching modes based on the first and second types further comprises:
coordinating the first and second pitching modes based on the type of the at least one load acting on the rotor blade using a hierarchical approach.

Clause 6. The method of any of the preceding clauses, wherein coordinating the first and second pitching modes based on the type of the at least one load acting on the rotor blade using the hierarchical approach further comprises:
first activating the cyclic pitching mode with pitch angle setpoints that reduce the loads acting on the rotor blade to a reduced load amount;
subsequently receiving one or more residual loading signals of the rotor blade; and,
comparing the one or more residual loading signals of the rotor blade to a second loading threshold.

Clause 7. The method of any of the preceding clauses, wherein if the one or more residual loading signals of the rotor blade exceed the second loading threshold, the method further comprises subsequently activating the collective pitching mode to further reduce the reduced load amount.

Clause 8. The method of any of the preceding clauses, wherein the cyclic pitching mode reduces a majority of the loads acting on the rotor blade and the collective pitching mode accounts for pitch system saturation and reduces the thrust.

Clause 9. The method of any of the preceding clauses, wherein the cyclic pitching mode comprises pitching each of the rotor blades cyclically along their respective pitch axes and the collective pitching mode comprises pitching each of the rotor blades together along their respective pitch axes.

Clause 10. The method of any of the preceding clauses, wherein the loading threshold corresponds to an extreme loading threshold.

Clause 11. A system for mitigating loads acting on a rotor blade of a wind turbine, the system comprising:
one or more sensors configured to generate a plurality of loading signals relating to the rotor blade; and,
a controller communicatively coupled to the one or more sensors, the controller comprising a processor configured to perform a plurality of operations, the plurality of operations comprising:
receiving the plurality of loading signals of the rotor blade;
determining at least one load acting on the rotor blade based on the plurality of loading signals of the rotor blade;
determining a type of the at least one load acting on the rotor blade;
comparing the at least one load to a loading threshold; and,
implementing a control scheme when the load exceeds the loading threshold, the control scheme comprising:
providing a first pitching mode for reducing a first type of load;
providing a different, second pitching mode for reducing a different, second type of load; and,
coordinating the first and second pitching modes based on the type of the at least one load to mitigate the loads acting on the rotor blade.

Clause 12. The system of clause 11, wherein the type of the at least one load acting on the rotor blade comprises at least one of a rotor imbalance or a thrust of a rotor of the wind turbine.

Clause 13. The system of clauses 11-12, wherein the first type of load comprises the rotor imbalance and the second type of load comprises the thrust.

Clause 14. The system of clauses 11-13, wherein the first pitching mode comprises a cyclic pitching mode, and wherein the second pitching mode comprises a collective pitching mode.

Clause 15. The system of clauses 11-14, wherein coordinating the first and second pitching modes based on the first and second types further comprises: coordinating the first and second pitching modes based on the type of the at least one load acting on the rotor blade using a hierarchical approach.

Clause 16. The system of clauses 11-15, wherein coordinating the first and second pitching modes based on the type of the at least one load acting on the rotor blade using the hierarchical approach further comprises:
first activating the cyclic pitching mode with pitch angle setpoints that reduce the loads acting on the rotor blade to a reduced load amount;
subsequently receiving one or more residual loading signals of the rotor blade; and,
comparing the one or more residual loading signals of the rotor blade to a second loading threshold.

Clause 17. The system of clauses 11-16, wherein if the one or more residual loading signals of the rotor blade exceed the second loading threshold, the plurality of operations further comprise subsequently activating the collective pitching mode to further reduce the reduced load amount.

Clause 18. The system of clauses 11-17, wherein the cyclic pitching mode reduces a majority of the loads acting on the rotor blade and the collective pitching mode accounts for pitch system saturation and reduces the thrust.

Clause 19. The system of clauses 11-18, wherein the cyclic pitching mode comprises pitching each of the rotor blades cyclically along their respective pitch axes and the collective pitching mode comprises pitching each of the rotor blades together along their respective pitch axes.

Clause 20. The system of clauses 11-19, wherein the loading threshold corresponds to an extreme loading threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for mitigating loads acting on a rotor blade of a wind turbine, the method comprising:
    receiving a plurality of loading signals of the rotor blade;
    determining a first load acting on the rotor blade and determining a second load acting on the rotor blade based on the plurality of loading signals of the rotor blade, the first load acting on the rotor blade comprising a rotor imbalance and the second load acting on the rotor blade comprising a thrust;
    determining a type of the first load acting on the rotor blade and determining a type of the second load acting on the rotor blade;
    comparing the first load to a first loading threshold and comparing the second load to a second loading threshold; and,
    implementing a control scheme when the first load exceeds the first loading threshold or when the second load exceeds the second loading threshold, the control scheme comprising:
        providing a first pitching mode for reducing the type of the first load acting on the rotor blade, wherein the type of the first load comprises a type of rotor imbalance and wherein the first pitching mode comprises a cyclic pitching mode;
        providing a different, second pitching mode for reducing the type of the second load acting on the rotor blade, wherein the type of the second load comprises a type of thrust and wherein the second pitching mode comprises a collective pitching mode; and,
        coordinating the first pitching mode and the second pitching mode to mitigate the first load or the second load acting on the rotor blade.

2. The method of claim 1, wherein coordinating the first pitching mode and the second pitching modes further comprises
    using a hierarchical approach.

3. The method of claim 2, wherein coordinating the first pitching mode and the second pitching modes using the hierarchical approach further comprises:
    first activating the cyclic pitching mode with pitch angle setpoints that reduce the first load or the second load acting on the rotor blade to a reduced load amount;
    subsequently receiving one or more residual loading signals of the rotor blade; and,
    comparing the one or more residual loading signals of the rotor blade to a second loading threshold.

4. The method of claim 3, wherein if the one or more residual loading signals of the rotor blade exceed the second loading threshold, the method further comprises subsequently activating the collective pitching mode to further reduce the reduced load amount.

5. The method of claim 4, wherein the cyclic pitching mode reduces a majority of the first load or the second load acting on the rotor blade and the collective pitching mode accounts for pitch system saturation and reduces the thrust.

6. The method of claim 3, wherein the cyclic pitching mode comprises pitching each of the rotor blades cyclically along their respective pitch axes and the collective pitching mode comprises pitching each of the rotor blades together along their respective pitch axes.

7. The method of claim 1, wherein the first loading threshold or the second loading threshold corresponds to an extreme loading threshold.

8. A system for mitigating loads acting on a rotor blade of a wind turbine, the system comprising:
    one or more sensors configured to generate a plurality of loading signals relating to the rotor blade; and,
    a controller communicatively coupled to the one or more sensors, the controller comprising a processor configured to perform a plurality of operations, the plurality of operations comprising:
    receiving the plurality of loading signals of the rotor blade;
    determining a first load acting on the rotor blade and determining a second load acting on the rotor blade based on the plurality of loading signals of the rotor blade, the first load acting on the rotor blade comprising a rotor imbalance and the second load acting on the rotor blade comprising a thrust;
    determining a type of the first load acting on the rotor blade and determining a type of the second load acting on the rotor blade;
    comparing the first load to a first loading threshold and comparing the second load to a second loading threshold; and,
    implementing a control scheme when the first load exceeds the first loading threshold or when the second load exceeds the second loading threshold, the control scheme comprising:
        providing a first pitching mode for reducing the type of the first load acting on the rotor blade, wherein the type of the first load comprises a type of rotor imbalance and wherein the first pitching mode comprises a cyclic pitching mode;
        providing a different, second pitching mode for reducing the type of the second load acting on the rotor blade, wherein the type of the second load comprises a type of thrust and wherein the second pitching mode comprises a collective pitching mode; and,
        coordinating the first pitching mode and the second pitching modes to mitigate the first load or the second load acting on the rotor blade.

9. The system of claim 8, wherein coordinating the first pitching mode and the second pitching modes further comprises
    using a hierarchical approach.

10. The system of claim 9, wherein coordinating the first pitching mode and the second pitching modes using the hierarchical approach further comprises:
    first activating the cyclic pitching mode with pitch angle setpoints that reduce the first load or the second load acting on the rotor blade to a reduced load amount;

subsequently receiving one or more residual loading signals of the rotor blade; and, comparing the one or more residual loading signals of the rotor blade to a second loading threshold.

11. The system of claim 10, wherein if the one or more residual loading signals of the rotor blade exceed the second loading threshold, the plurality of operations further comprise subsequently activating the collective pitching mode to further reduce the reduced load amount.

12. The system of claim 11, wherein the cyclic pitching mode reduces a majority of the first load or the second load acting on the rotor blade and the collective pitching mode accounts for pitch system saturation and reduces the thrust.

13. The system of claim 10, wherein the cyclic pitching mode comprises pitching each of the rotor blades cyclically along their respective pitch axes and the collective pitching mode comprises pitching each of the rotor blades together along their respective pitch axes.

14. The system of claim 8, wherein the first loading threshold or the second loading threshold corresponds to an extreme loading threshold.

\* \* \* \* \*